US012104711B2

(12) United States Patent
Schneider et al.

(10) Patent No.: US 12,104,711 B2
(45) Date of Patent: Oct. 1, 2024

(54) VALVE DEVICE

(71) Applicant: HYDAC FLUIDTECHNIK GMBH, Sulzbach/Saar (DE)

(72) Inventors: Wolfgang Friedrich Wilhelm Schneider, Thun (CH); Roger Daniel Tanner, Liebefeld (CH); Marcel Stamber-Bur, Kleinblittersdorf (DE)

(73) Assignee: HYDAC FLUIDTECHNIK GMBH, Sulzbach Saar (DE)

( * ) Notice: Subject to any disclaimer, the term of this patent is extended or adjusted under 35 U.S.C. 154(b) by 70 days.

(21) Appl. No.: 18/010,049

(22) PCT Filed: May 28, 2021

(86) PCT No.: PCT/EP2021/064339
§ 371 (c)(1),
(2) Date: Dec. 13, 2022

(87) PCT Pub. No.: WO2022/002501
PCT Pub. Date: Jan. 6, 2022

(65) Prior Publication Data
US 2023/0228341 A1    Jul. 20, 2023

(30) Foreign Application Priority Data
Jul. 2, 2020 (DE) ...................... 10 2020 003 973.1

(51) Int. Cl.
F16K 31/10 (2006.01)
F16K 3/24 (2006.01)
F16K 27/04 (2006.01)
(52) U.S. Cl.
CPC ................ F16K 31/10 (2013.01); F16K 3/24 (2013.01); F16K 27/041 (2013.01); F16K 27/048 (2013.01)

(58) Field of Classification Search
None
See application file for complete search history.

(56) References Cited

U.S. PATENT DOCUMENTS 2,954,801 A * 10/1960 Nelson ..................... F15B 13/02
137/625.66
3,107,547 A * 10/1963 Vermeulen .......... F15B 13/0402
74/41

(Continued)

FOREIGN PATENT DOCUMENTS

DE    196 17 849    11/1997
DE    297 15 748    12/1997

(Continued)

OTHER PUBLICATIONS

International Search Report (ISR) issued Nov. 17, 2021 in International (PCT) Application No. PCT/EP2021/064339.

Primary Examiner — Matthew W Jellett
(74) Attorney, Agent, or Firm — WENDEROTH, LIND & PONACK, L.L.P.

(57) ABSTRACT

A valve device has a valve housing (10, 54, 94, 166) and fluid ports in the valve housing (connected to or separated from one another in a fluid-conveying manner by a valve piston (22) displaceable along its longitudinal axis (24) in its various travel positions. A latching device (26, 28) latches the valve piston (22) in at least one of its travel positions. Individual latching parts (30, 38, 170) of the latching device, when it is actuated by an external force, take latching positions spatially different from one another with respect to the longitudinal axis (24) of the valve piston (22). The individual latching parts (30, 38, 170) of the latching device (26, 28) take positions differing from one another both in the axial direction and in the radial direction in the individual latching positions.

11 Claims, 3 Drawing Sheets

(56) References Cited

U.S. PATENT DOCUMENTS

| | | | |
|---|---|---|---|
| 3,128,677 A | | 4/1964 | Tennis |
| 3,625,475 A | | 12/1971 | Stephens |
| 3,790,125 A | * | 2/1974 | Swatty .................... F16K 31/56 |
| | | | 251/74 |
| 4,265,144 A | * | 5/1981 | Clark ...................... F16D 48/02 |
| | | | 137/625.69 |
| 4,279,334 A | * | 7/1981 | Plate ...................... B60W 30/18 |
| | | | 251/297 |
| 11,499,646 B2 | * | 11/2022 | Kozma ................. B60T 15/048 |
| 12,025,240 B2 | * | 7/2024 | Schneider ........... F16K 31/0624 |
| 2023/0228345 A1 | * | 7/2023 | Schneider ........... F16K 31/0627 |
| | | | 137/383 |

FOREIGN PATENT DOCUMENTS

| | | |
|---|---|---|
| DE | 20 2006 014 780 | 1/2007 |
| GB | 1098310 | 1/1968 |

* cited by examiner

VALVE DEVICE

FIELD OF THE INVENTION

The invention relates to a valve device having a valve housing and fluid ports disposed therein, which ports are connected to or separated from one another in a fluid-conveying manner by a valve piston being displaceable along its longitudinal axis in its various travel positions and having at least one latching device or latch for latching the valve piston in at least one of its travel positions. Individual latching parts of the latching device, when it is actuated by an external force, take latching positions spatially different from one another.

BACKGROUND OF THE INVENTION

DE 196 17 849 A1 discloses a device for clamping a piston of a directional control valve in its respective setting position. The device has a valve housing, in which the piston is disposed in an axially displaceable manner. A clamping device is provided at each axial end of the valve housing. An attached piston part, whose cross section widens conically in the direction of its free end and which is enclosed by a cage of the clamping device, adjoins the respective axial end of the valve piston. The cage is provided with recesses, in which ball-shaped clamping bodies are inserted, which clamping bodies are arranged in the radial direction between the piston part at the valve piston and the valve housing. When flow forces try to move the valve piston against the switching direction, the clamping effect of the clamping device sets in. In so doing, the piston part presses the balls radially against a sleeve firmly installed in the valve housing, thereby holding the valve piston axially assisted by friction in a form-fitting manner. When the valve piston is to be moved to its other switching position, the plunger of a magnetic actuating device acts on the cage, causing the cage to move in the direction of the valve piston in such a way that first the friction-assisted form-fitting holder of the valve piston is detached by loosening the clamped balls and then, after a short travel distance of the cage, the cage carries the valve piston along to its other switching position.

As the cage moves, it carries the balls along and the balls take up various axial and radial positions along the cone guide formed by the attached piston part. The friction-assisted form-fitting positioning of the valve piston does not correspond to an exactly predefinable travel position of the valve piston, in particular with regard to its end positions to be taken, but rather every travel position of the valve piston, in which an unintentional switching of the valve piston by the balls is prevented, shall be regarded as "held". This arrangement increases the clamping force effect when holding the valve piston against the actuating direction in the event of an unintentional travel motion, making subsequent actuation more difficult.

DE 20 2006 014 780 U1 discloses a pneumatic valve for controlling air flows at low operating pressures, having a valve spool disposed in a valve housing so as to be linearly displaceable and having holding means for the detachable immobilization of the valve spool at the housing in two switching positions reached by the linear displacement. The holding means have at least: a receiving channel passing transversely through the valve spool and its two mutually opposite channel orifices opening out towards the outer circumference of the valve spool. Two ball-shaped latching members are disposed in the receiving channel in the area of the two channel orifices and can move largely independently of each other relative to the valve spool in the longitudinal direction of the receiving channel. A compression spring is device disposed in the receiving channel between the two latching members and acts on the two latching members in the sense of keeping them apart.

Two latching recess arrangements are stationary in the direction of the linear displacement motion of the valve spool with respect to the valve housing, each being shaped like an annular groove coaxial with the valve spool, which annular groove is disposed in the area of the outer circumference of the valve spool at a position corresponding to the switching position to be set and with which the two latching members can come into detachable latching engagement when the switching position to be set is reached. The individual latching positions are spaced apart from one another as viewed axially with respect to the longitudinal axis of the valve spool, but lie on a common circumferential plane with respect to the longitudinal axis, such that the pairs of latching balls are pressed out of the latching position against the spring force effect when the valve spool is moved and, after passing through the axial travel path, move into the new latching position due to the spring force, which, as viewed radially, is located on the same diameter as the first latching position.

Once one of the two switching positions has been reached, the valve spool remains in the corresponding position even if the actuating force applied by a pilot valve device that brought it into this latching position is removed. The valve spool therefore remains in the respective switching position without a constant supply of energy from the outside until it receives a switching pulse, wherein the latching balls, which are spring-loaded in their respective latching positions, can remain on the valve spool in view of the relatively low pneumatic forces.

For very high fluid forces, such as those that regularly occur in hydraulics, the known solution is therefore unlikely to be very suitable.

SUMMARY OF THE INVENTION

The invention addresses the problem of providing a valve device having a functionally reliable latching system of its valve piston, which latching system is also suitable for high forces, as regularly occur in hydraulics.

A valve device according to the invention entirety solves this problem.

The valve device according to the invention is characterized in that, with respect to the longitudinal axis of the valve piston, the individual latching of the latching device take positions differing from one another both in the axial direction and in the radial direction in the individual latching positions.

In accordance with the invention, it has first been recognized that the latching device has to fulfill contradictory functions. Ideally, the latching device should be designed in such a way that, on the one hand, it holds the valve piston, which is subject to high forces depending on the use of the valve device, securely in its respective latching position, in that way counteracting any unintentional motion of the valve piston, and that, on the other hand, when the valve is intentionally actuated and the valve piston is moved, the latching device releases the valve piston for its travel motion without requiring a great deal of force. The features of the invention take these conditions into account. A high force acting on the valve piston can be, for instance, a fluid force and/or spring force.

The features—of the invention, in contrast to the valve device known from the prior art, provide for a latching separate from the valve piston, on which high forces may act depending on the use of the valve device, such that the latched immobilization of the valve piston can be detached by an actuating device without simultaneous action on the valve piston and without friction-based clamping of the latching in a kind of pilot control. Accordingly, the actuating force to be applied by the actuating device to detach the latching system does not directly depend on the fluid force acting on the valve piston during operation of the valve device. In addition, when the valve piston is latched in place, the holding force applied by the latching device is completely independent of friction. This means that, at least in the case of high forces acting on the valve piston, an actuating device can be selected that is less powerful than an actuating device by which the latching can be detached by direct action on the valve piston, which helps to reduce the cost of energy and the space required by the valve device. As a result, the range of application of the device according to the invention can be increased. Because the pilot control and/or the holding effect in each case manage at least partially without spring force support, and in particular the latching balls of the latching device are controlled via a kind of link guide in relation to their travel motions, the operational safety is increased, such that the valve device according to the invention can also be used in particular for safety-relevant areas, such as controls of power presses or actuating devices for power plants.

Further advantages of the solution according to the invention are the subject of the dependent claims.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are general and are not to scale.

DETAILED DESCRIPTION OF THE INVENTION

Figure 1:
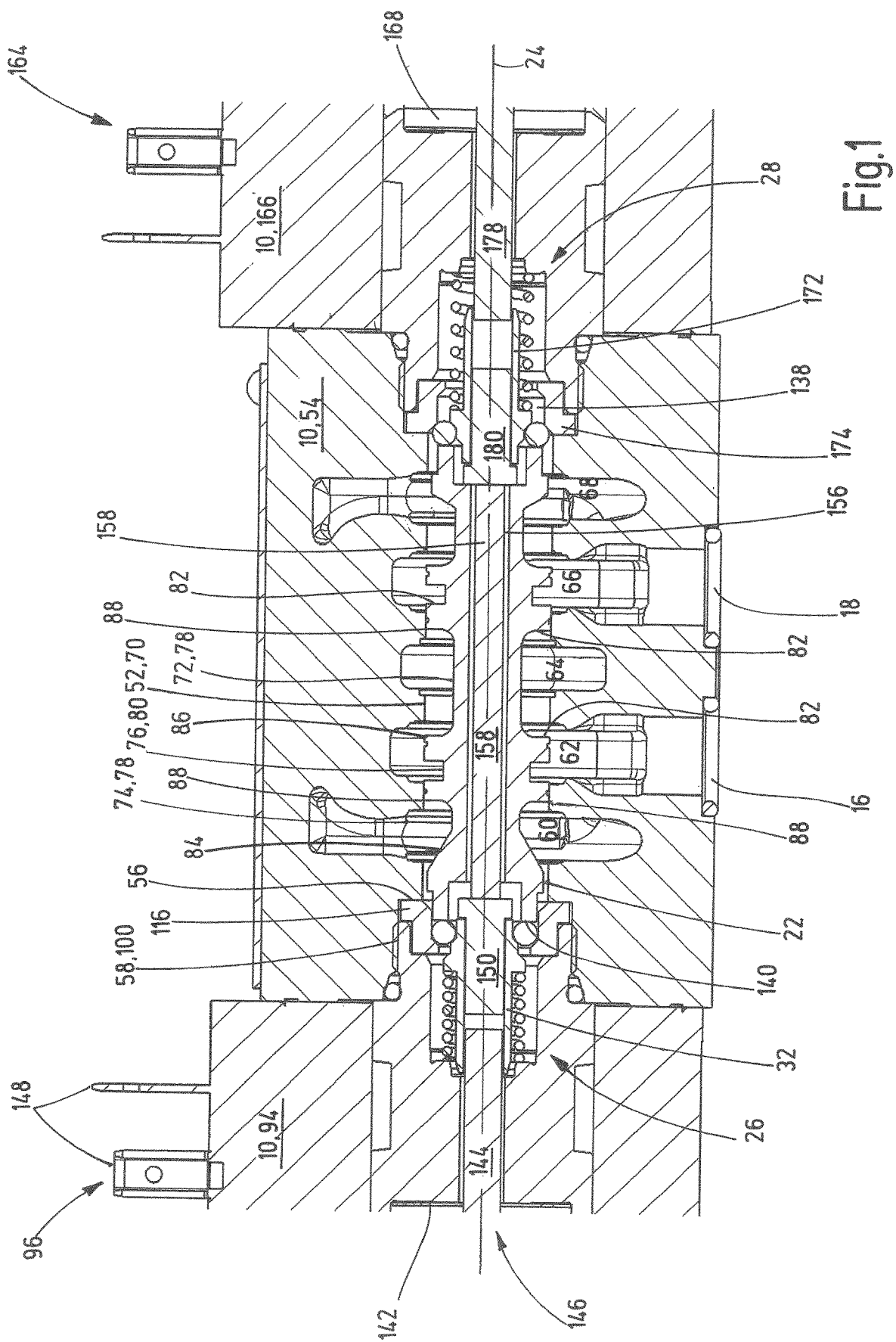
FIG. 1 is a schematically simplified, side view in section of a valve device according to an exemplary embodiment of the invention.
Figure 2:
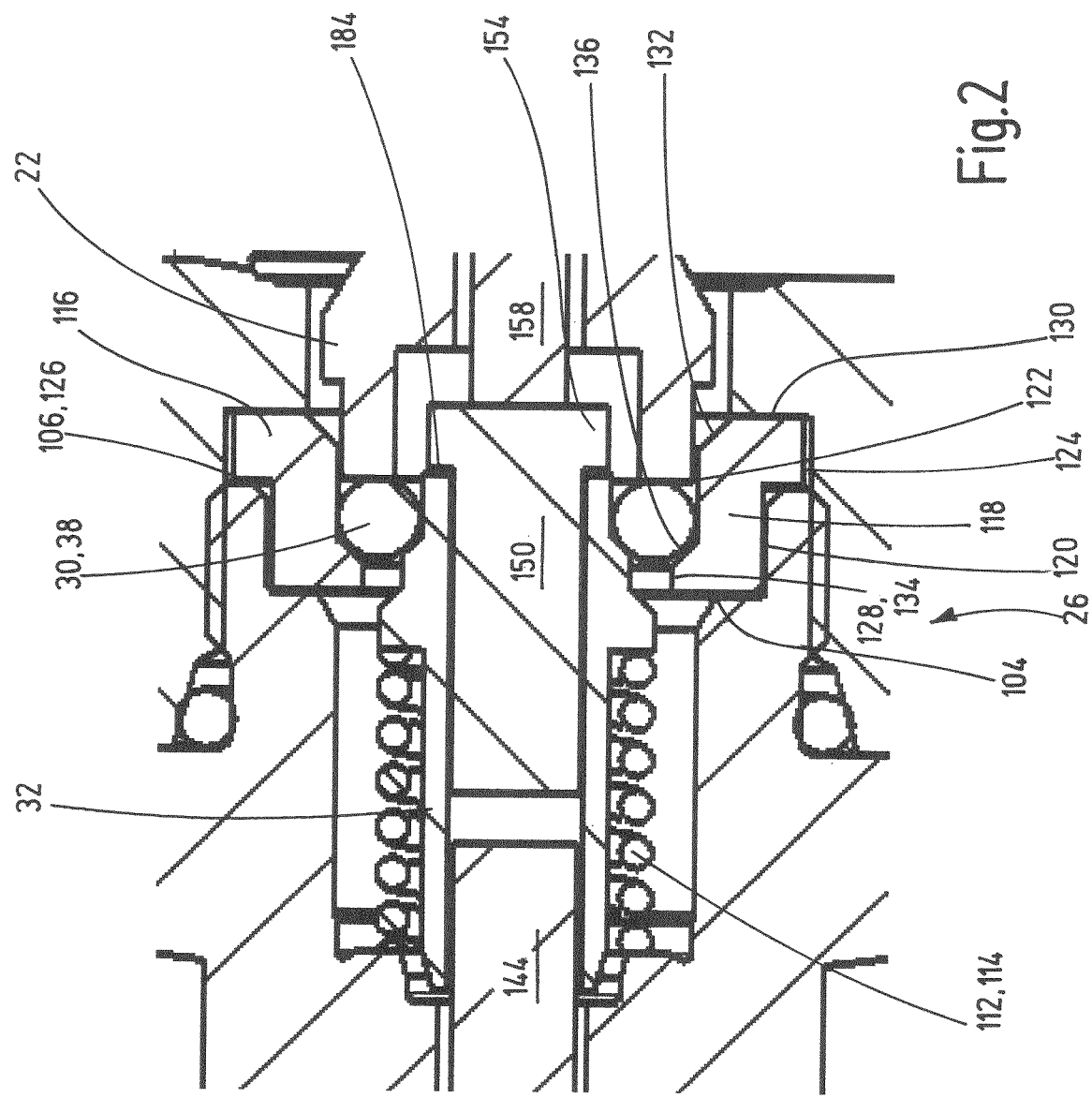
FIG. 2 is an enlarged, a partial side view in section of the valve device of FIG. 1 in the area of its one latching device.
Figure 3:
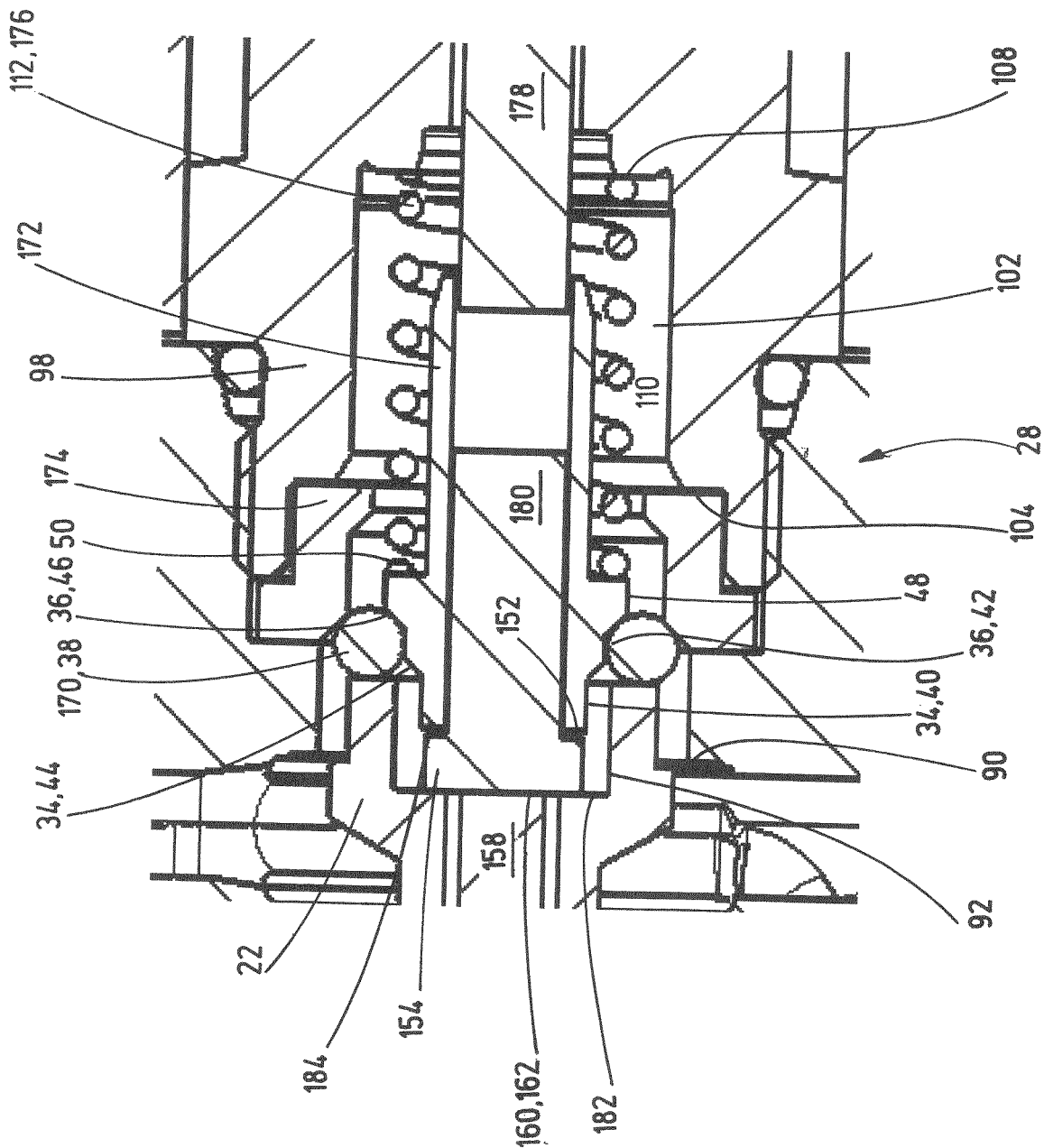
FIG. 3 is an enlarged, a partial side view in section of the valve device of FIG. 1 in the area of its other latching device.

FIG. 1 shows a valve device according to the invention, having a valve housing 10, 54, 94, 166, in which fluid ports 16, 18 are disposed. A valve piston 22, which can be displaced along a longitudinal axis 24 of the valve housing 10, 54, 94, 166 by external force and can thus be disposed in different travel positions in the valve housing to connect the fluid ports 16, 18 to each other or disconnect them from each other in a fluid-conveying manner, depending on the travel position of the valve piston 22.

The valve device also has at least one latching device 26, 28 having individual latching means 30, 38, 170 for latching the valve piston 22 in at least one of its travel positions. The respective latching devices 26, 28 are set up in such a way that they can be in spatially different latching positions. In the individual latching positions, the individual latching means or parts 30, 38, 170 of each respective latching device 26, 28 take different positions from each other in both the axial and radial directions, relative to the longitudinal axis 24 of the valve piston 22.

The first latching device 26 has a first rotationally symmetrical control body 32s used to move the latching parts 30, 38 of the first latching device 26 into their different latching positions. The first control body 32 is guided for travel along the longitudinal axis 24 of the valve piston 22 and has on its outer circumference a first annular control surface 34 and a second annular control surface 36, each of which is coaxial with the longitudinal axis 24 of the valve piston 22. Each control surface 34, 36 is used to control the latching means 30 in the form of balls 38 and has a pitch-free control surface part 40, 42 extending in parallel to the longitudinal axis 24 of the valve piston 22, and a control ramp 44, 46. It is also conceivable that each control surface 34, 36 is formed exclusively from a pitch-free control surface part 40, 42 extending in parallel to the longitudinal axis 24 of the valve piston 22, wherein the control surfaces 34, 36 merge abruptly forming a step. The radial distance between the second pitch-free part 42 of the second control surface 36 and the longitudinal axis 24 of the valve piston 22 is greater than the radial distance between the first pitch-free part 40 of the first control surface 34 and the longitudinal axis 24 of the valve piston 22.

The first pitch-free part 40 is provided at the end facing the valve piston 22, of the circumference of the first control body 32 from which first pitch-free part 40 the second pitch-free part 42 is disposed at a distance, directed in the direction of the longitudinal axis 24 and away from the valve piston 22. A third pitch-free part 48 is formed as an outer peripheral surface of the first control body 32, again spaced apart from the second pitch-free part 42, in the direction of the longitudinal axis 24 and facing away from the valve piston 22. The radial distance between the third pitch-free part 48 and the longitudinal axis 24 of the valve piston 22 is greater than the radial distance between the second pitch-free part 42 and the longitudinal axis 24 of the valve piston 22.

The first control ramp 44 of the first control surface extends between the first pitch-free part 40 and the second pitch-free part 42, which first control ramp 44 has a linear slope starting at the first pitch-free part 40, and the second control ramp 46 of the second control surface 36 extends between the second pitch-free part 42 and the third pitch-free part 48, which second control ramp 46 has the linear slope starting at the second pitch-free part 42. As a result, in the area of the first 44 and the second 46 control ramps the first control body 32 widens conically from the end facing the valve piston 22 toward its end facing away from the valve piston 22. Starting from the third pitch-free part 48 in the direction of its end facing away from the valve piston 22, the outer diameter of the first control body 32 decreases abruptly to the diameter corresponding to its diameter in the area of its first pitch-free part 40, forming a step 50. At its end area facing away from the valve piston 22, the first control body 32 tapers in the direction of its end facing away from the valve piston 22.

The valve piston 22 is displaceably guided in a passage 52 of a main housing part 54, which housing part has an inner circumferential widening 58 in the direction of its end facing the first control body 32, forming a step 56. The valve piston 22 is spaced apart from the inner circumference of the main housing part 54 in the area of the passage widening 58. The main body part 54 has a pressure supply port (not shown in the figures), two utility ports 16, 18, and two return ports (not shown in the figures). From each of these fluid ports 16, 18, one fluid passage each extends through the main housing part 54 towards the valve piston 22 and discharges into a first control space 60, second control space 62, third control space 64, fourth control space 66, and fifth control space 68 in the main housing part 54. Specifically, the first return or tank port and second return or tank port is connected in a fluid conveying manner to the first control chamber 60 and fifth control chamber 68, respectively, the first utility port 16 and the second utility port 18 are connected in a fluid conveying manner to the second control chamber 62 and fourth control chamber 66, respectively, and the pressure supply port is connected in a fluid conveying manner to the third control chamber 64. Every control chamber 60, 62, 64, 66, 68 is disposed coaxially with the longitudinal axis 24 of the valve piston 22 as part of the passageway 52 through the valve housing 10, 54 and has an inner diameter larger than the inner diameter of the passageway 52 in the area of guide parts 70 for guiding the valve piston 22, which guide parts 70 are each provided between two adjacent control chambers 60, 62, 64, 66, 68. In that way, the valve piston 22 extends through each of the control chambers 60, 62, 64, 66, 68.

The valve piston 22 has an annular recess of a first type 72 in its central area and an annular recess of a second type 74 in the central area of its half facing the first control body 32. The valve piston 22 has a recess of a third type 76 in the area between the recess of the first 72 and second 74 types.

As viewed in longitudinal section, the recesses of the first type 72 to third type 76 are each U-shaped or trough-shaped. Thus, the respective recess 72, 74, 76 has a base 78, 80 extending in parallel to the longitudinal axis 24 of the valve piston 22. The radial distances between the respective base 78 of the recess of the first type 72 and second type 74 and the longitudinal axis 24 of the valve piston 22 are identical. The radial distance of the base 80 of the recess of the third type 76 is comparatively larger. One sidewall part 82 each extends radially outwards from the ends of the base 78, 80 of the recesses of the first type 72 and third type 76 and from the end facing away from the first control body 32, of the base 78 of the recess of the second type 74. From the end facing the first control body 32, of the base 78 of the recess of the second type 74, a sidewall part 84 extending obliquely in the axial direction and simultaneously in the radial direction extends outwards. The largest outer diameter of the valve piston 22 is in the area between adjacent recesses 72, 74, 76.

The transition of the sidewall part 82 of the recess of the first type 72, which extends away from the end facing the first control body 32, of the base 78 to the full, i.e. largest, outer diameter of the valve piston 22, forms a first control edge 86. The transition of the respective sidewall part 82 of the recesses of the first and second types, which sidewall part extends away from the end facing away from the first control body 32, of the base 78 to the full outer diameter of the valve piston 22 forms a second control edge 88 of the respective recess 72, 74.

Starting from the transition of the side wall part 84 of the recess of the second type 74, which extends away from the end facing the first control body 32, of the base 78 to the outer diameter of the valve piston 22 in the direction of the end facing the first control body 32, of the valve piston 22, the outer diameter of the valve piston 22 initially extends with a diameter that is larger and smaller than the smallest and the largest outer diameter, respectively, of the valve piston 22, whereupon the outer diameter is reduced while forming a step 90. This outer diameter is larger than the smallest outer diameter of the valve piston 22. A cylindrical recess 92 is formed in the end face 140 facing the first control body 32, of the valve piston 22, the inner diameter of the recess 92 is smaller and larger than the outer diameter of the first control body 32 in the area of the third pitch-free part 48 and second pitch-free part 42, respectively.

A housing 94 of a first actuating device 96 adjoins the main housing part 54 at the end facing the first control body 32, of the main housing part 54. The housing 94 of the first actuating device 96 has, at an end facing the main housing part 54, a cylindrical extension 98 extending towards the main housing part 54 and having an outer circumference largely corresponding to the inner circumference of the passage extension 58 of the main housing part 54. A threaded section 100 between the outer circumference of the cylindrical extension 98 of the housing 94 of the first actuating device 96 and the passage extension 58 of the main housing part 54 is used to secure the housing 94 of the first actuating device 96 to the main housing part 54. Starting from the end face which faces the main housing part 54, of the extension 98 of the housing 94 of the first actuating device 96, a cylindrical recess 102 is formed in the extension 98, which extends coaxially with the longitudinal axis 24 of the valve piston 22. The inner diameter of the cylindrical recess 102 decreases, forming a step 104, starting from the opening 106 facing the valve piston 22, of the recess 102 and moving toward its closed bottom 108.

The first control body 32 is disposed in a space 110 formed by the recess 102 of the housing 94 of the first actuating device 96 and by the passage extension 58 of the main housing part 54. In this space 110, the first control body 32 is exposed to a preload in the direction of the valve piston 22 under the action of an energy accumulator 112 in the form of a first compression spring 114. One end of the first compression spring 114 rests against the step 50 of the first control body 32 and the other end rests against the bottom 108 of the cylindrical recess 102 of the extension 98.

The spherical latching means 30, 38 guide the first control body 32 in a second annular control body 116, which is secured in the space between the extension 98 of the housing 94 of the first actuating device 96 and the main housing part 54. The second control body 116 is oriented coaxially with the longitudinal axis 24 of the valve piston 22 and is mainly Z-shaped in longitudinal section.

In longitudinal section, the second control body 116 has a cuboid base part 118, the longitudinal sides 120, 122 of which are oriented in the direction of the longitudinal axis 24 of the valve piston 22. The longitudinal side 120 facing away from the longitudinal axis 24 of the valve piston 22, of the base part 118 is in contact with the inner circumference of the recess 102 of the housing 94 of the first actuating device 96 in the area of its largest inner diameter. A first projection 124, which is cuboid in longitudinal section, extends radially outwards away from the end area facing the valve piston 22, of the longitudinal side 120 facing away from the longitudinal axis 24 of the valve piston 22, of the base part 118. The inner diameter of the second control body 116 in the area of its base part 118 is slightly larger than the outer diameter of the end part reduced in outer diameter, of the valve piston 22, each of which is smaller than the smallest inner diameter of the passage 52 of the main housing part 54. The end part, the outer diameter of which is reduced, of the valve piston 22 is slightly spaced apart from the second control body 116 in the radial direction, and can be retracted into the second control body 116 in the axial direction. One side of the first projection 124 abuts the end face 126 of the extension 98 of the housing 94 of the first actuating device 96, and abuts the step 56 of the passage 52 of the main housing member 54 on the other side. A second projection 128 extends radially inwards from the end area facing away from the valve piston 22, of the longitudinal axis 24 of the longitudinal side 122 facing the longitudinal axis 24 of the valve piston 22, of the base part 118. The end facing the longitudinal axis 24 of the valve piston 22, of the base 118 abuts the step 104 of the recess 102 of the extension 98 of the housing 94 of the first actuating device 96. The inner diameter of the second control body 116 in the area of its second projection 128 is smaller than the smallest inner diameter of the recess 102 of the housing 94 of the first actuating device 96.

A first stop surface 132 for the latching means 30, 38 extends obliquely away from the longitudinal axis 24 of the valve piston 22 towards the outside, starting from the end 122 facing the longitudinal axis 24, of the base part 118 of the second control body 116 to the end face 130 facing the valve piston 22, of the base part 118. A second stop surface 136 for the latching means 30, 38 extends obliquely away from the longitudinal axis 24 of the valve piston 22 towards the outside, starting from the side 134 facing the longitudinal axis 24, of the second projection 128 of the second control body 116 to the side 122 facing the longitudinal axis 24 of the valve piston 22, of the base part 118. Formed in this way, the two stop surfaces 132, 136 have different radial distances from the longitudinal axis 24 of the valve piston 22. The two stop surfaces 132, 136 form the individual radially and axially spaced from each other latching positions in conjunction with the control surfaces 34, 36 of the first control body 32.

The first 32 and the second 116 control body in conjunction delimit a gap-shaped space 138, in particular shaped as an annular space, in which every latching means 30 in form of a ball 38 is guided on a free path from its one latching position to the other latching position, which are axially separated from each other by the free path. In the latching position closest to the first actuating device 96, the respective ball 38 is disposed between the first control surface 34 of the first control body 32, the second stop surface 136, the longitudinal side 122 facing the longitudinal axis 24 of the valve piston 22, of the base part 118 of the second control body 116, and the annular end face 140 facing the first control body 32, of the valve piston 22. In the latching position most distant from the first actuating device 96, the respective ball 38 is disposed between the second control surface 36 of the first control body 32, the first stop surface 132, and the annular end face 140 facing the first control body 32, of the valve piston 22. The path distance between the latching positions is selected such that when the valve piston 22 travels this distance from a current travel position, in which one utility port 16, 18 is supplied with pressurized fluid by means of the pressure supply port and the other utility port 18,16 is disconnected from the pressure supply port, to another travel position in which the other utility port 18, 16 is supplied with pressurized fluid by means of the pressure supply port and the one utility port 16, 18 is disconnected from the pressure supply port.

The first actuating device 96 has an energizable, first actuating magnet 142 that acts on a first actuating rod 144 of a multipart rod system drive 146. On the upper end of the housing 94 of the first actuating device 96, plug parts 148 are provided, which are electrically connected to the actuating magnet 142 and which can be used to energize the actuating magnet 142. The first actuating rod 144 extends from the end facing away from the valve piston 22, of the first control body 32 into the first control body 32, which is formed as a hollow body and is guided on the actuating rod 144. A rotationally symmetrical first rod system part 150 is guided in the first control body 32, the end area facing the valve piston 22, of which first rod system part 150 is provided with a full circumferential disk-shaped widening 154 on the outer circumference, forming a step 152, which projects out of the first control body 32 in the direction of the valve piston 22. The widening 154 has a larger and smaller outer diameter than the inner diameter of the first control body 32 and then the first control body 32, respectively, in the area of the first pitch-free part 40 of the first control surface 34. The valve piston 22 has a central through hole 156, in which a control rod 158 is guided as part of the rod system drive 146, wherein the first rod system part 150 is disposed between the control rod 158 and the first control body 32. Owing to the preloading of the first control body 32 by means of the compression spring 114, the end face 184 facing the valve piston 22, of the first control body 32 is in contact with the step 152 of the first rod system part 150, and its end face 160 facing the valve piston 22 is in contact with the end face 162 facing the first control body 32, of the control rod 158.

When the valve piston 22 is moved to its center position, the other half of the valve device facing away from the first control body 32 corresponds in a mirrored manner on a plane arranged perpendicular to the longitudinal axis 24 of the valve piston 22 and intersecting the third control space 64 and the valve piston 22 centrally, to the described above half of the valve device having the first control body 32, such that latching devices 26, 28, namely the first latching device 26 and a second latching device 28, are arranged on opposite ends of the valve piston 22, respectively.

Thus, the other half of the valve device comprises the second latching means 28, a second actuating device 164, and further parts of the rod system drive 146. The second actuating device 164 has a second housing 166, and a second actuating magnet 168. The second latching device 28 has second latching means 170, a third control body 172 and a fourth control body 174, and a second compression spring 176. The parts of the rod system drive 146 assigned to the other half have a second actuating rod 178 and a second rod system part 180. If (partial) components of the second latching device 28 are not numbered in the description with reference signs differing from the identical (part) components of the first latching device 26, the reference signs of the first latching device 26 apply equally to the second latching device 28.

The two latching devices 26, 28 are active in each of the opposite end positions of the longitudinally movable valve piston 22 and otherwise release the valve piston 22 for its motions between the end positions.

Owing to the motion of the latching means during the unlocking process, friction can occur between the components of the valve device coming into contact with the latching means. Therefore, the components of the valve device that come into contact with the latching means can have low-friction surfaces or be coated with low-friction materials, ensuring permanently easy and low-wear actuation of the respective latching device without any loss of operational reliability.

The functioning of the valve device according to the invention is described in more detail below:

As shown in FIG. 1, the balls 38 of the first latching device 26 are disposed between the first control surface 34 of the first control body 32, the second stop surface 136 and the side 122 facing the longitudinal axis 24 of the valve piston 22, of the base part 118 of the second control body 116 and the annular end face 140 facing the first control body 32 in the latching position, of the valve piston 22. In addition, in the one latching position the balls 38 of the second latching device 28 are disposed between the second control surface 36 of the third control body 172, the first stop surface 132 of the fourth control body 174, and the annular end face 140 facing the third control body 172, of the valve piston 22.

In this case, the second compression spring 176 is used to preload the third control body 172 in the direction of the first actuating device 96, and the end face 160 of the widening 154 of the second rod system part 180 is in contact with the bottom 182 of the end-face recess 92 of the valve piston 22 and the end face 162 of the control rod 158, each of which faces the second actuating device 164 and is flush with one another. Because the control rod 158 is longer than the through hole 156 of the valve piston 22 between the two bottoms 182 of its end recesses 92, the control rod 158 protrudes in the direction of the first actuating device 96 beyond the bottom 182 of the recess 92 facing the first actuating device 96, of the valve piston 22 into this recess 92. The end face 162 facing the first actuating device 96 of the control rod 158 is in contact with the end face 160 facing the second actuating device 164, of the widening 154 of the first rod system part 150, the step 152 of the first rod system part 150 is in contact with the end face 184 facing the second actuating device 164, of the first control body 32. The first compression spring 114 preloads the first control body 32 towards the second actuating device 164.

As a result, the valve piston 22, which is in contact with the latching balls 38 on both ends, is arranged in its one latching position closest to the first actuating device 96. In this arrangement, the control edges 86, 88 of the valve piston 22 cover the control chambers 60 to 68 in the valve housing 10, 54 in such a way that the pressure supply port is connected to the first utility port 16 in a fluid-conveying manner and is separated from all other fluid ports 18 and, at the same time, the second utility port 18 is connected to the second return port in a fluid-conveying manner and disconnected from all other fluid ports 16.

If the valve piston 22 is to be moved from the one latching position shown in FIG. 1 to its other latching position, the actuating magnet 142 of the first actuating device 96 is energized, acts on the first actuating rod 144 and extends in the direction of the second actuating device 164. In this case, the actuating rod 144 acts on the first rod system part 150, whose widening 154 lifts off from the end face 184 facing the second actuating device 164, of the first control body 32 in the direction of the second actuating device 164 and acts on the control rod 158. As a result, the control rod 158 is moved in the direction of the second actuating device 164 relative to the valve piston 22 until the end face 160 facing the second actuating device 164 of the widened section 154 of the first rod system part 150 comes into contact with the bottom 182 of the end-face recess 92 facing the first actuating device 96, of the valve piston 22.

After coming into contact with the end face 160 facing the second actuating device 164 of the widening 154 of the first rod system part 150, the valve piston 22 is moved in conjunction with the control rod 158 in the direction of the second actuating device 164. Acted upon by the control rod 158, the end face 160 facing the first actuating device 96, of the widening 154 of the second rod system part 180 lifts off from the bottom 182 of the end-face recess 92 facing the second actuating device 164, of the valve piston 22, wherein the step 152 of the second rod system part 180 comes into contact with the end face 184 of the third control body 172 and takes along the third control body 172 in the direction of the second actuating device 164 against the action of the second compression spring 176.

During this travel motion, the balls 38 of the respective latching device 26, 28 change their position in the axial and radial directions on their free path from one latching position to the other.

Accordingly, in the other latching position the balls 38 of the first latching device 26 are arranged between the second control surface 36 of the first control body 32, the first stop surface 132 of the second control body 116, and the annular end face 140 facing the first control body 32, of the valve piston 22. In addition, the balls 38 of the second latching device 28 are arranged between the first control surface 34 of the third control body 172, the second stop surface 136 and the side 122 facing the longitudinal axis 24 of the valve piston 22, of the base part 118 of the fourth control body 174, and the annular end face 140 facing the third control body 172, of the valve piston 22.

The valve piston 22, which is in contact with the latching balls 38 on both ends, is arranged in its other latching position closest to the second actuating device 164. It is also conceivable that the valve piston 22 at least on one end at one of its steps 90 is in contact with a component of the valve device in the manner of a stop, in particular at the second 116 or fourth 174 control body. In this arrangement, the control edges 86, 88 of the valve piston 22 cover the control chambers 60 to 68 in the valve housing 10, 54 in such a way that the pressure supply port is connected to the second utility port 18 in a fluid-conveying manner and is separated from all other fluid ports 16 and, at the same time, the first utility port 16 is connected to the first return port in a fluid-conveying manner and disconnected from all other fluid ports 18.

If the valve piston 22 is to be moved from the other latching position to its one latching position shown in FIG. 1, the actuating magnet 168 of the second actuating device 164 is energized.

While one embodiment has been chosen to illustrate the invention, it will be understood by those skilled in the art that various changes and modifications can be made therein without departing from the scope of the invention as defined in the claims.

The invention claimed is:
1. A valve device, comprising:
a valve housing with fluid ports disposed in the valve housing;
a valve piston being displaceable along a longitudinal axis thereof between at least first and second travel positions in the valve housing connecting or separating the fluid ports in a fluid-conveying manner; and
first and second latches being at opposite ends of the valve piston and latching the valve piston in the first and second travel positions, individual latching parts of each of the first and second latches, when actuated by respective external forces, being movable to individual latching positions spatially different from one another with respect to the longitudinal axis of the valve piston, the individual latching positions differing from one another both in axial directions and in radial directions of the longitudinal axis of the valve piston, the first and second latches having first and second control bodies, respectively, at the opposite ends of the valve piston; and
a rod system drive having a control rod passing through the valve piston and alternatively actuating the first and second latches.

2. The valve device according to claim 1 wherein
the first and second control bodies are guided for movement along the longitudinal axis of the valve piston and each has first and second control surfaces supporting the individual latching parts of each of the first and second latches in the individual latching positions.

3. The valve device according to claim 2 wherein
the first and second control surfaces of each of the first and second control bodies have individual control ramps which, starting from the valve piston, are arranged on diameters of different sizes of the first and second control bodies.

4. The valve device according to claim 3 wherein
the individual control ramps have same pitches.

5. The valve device according to claim 1 wherein
the rod system drive applies the external forces actuating the first and second latches and acts on the first and second control bodies that are additionally preloaded by the action of an energy storage.

6. The valve device according to claim 5 wherein
the energy storage is a compression spring.

7. The valve device according to claim 1 wherein energizable actuating magnets actuate the rod system drive.

8. The valve device according to claim 1 wherein
the first and second control bodies are movably guided in a third and fourth control bodies, respectively, the third and fourth control bodies delimiting spaces in which each of individual latching parts of the first and second latches are guided on free paths from one of the individual latching positions to another one the individual latching positions; and
a length of each the free paths is selected such that the valve piston is movable to one of the first and second travel positions in which one the fluid ports previously supplied with fluid at a predeterminable pressure is separated from a pressure supply port and another of the fluid ports is supplied with pressure fluid via the pressure supply.

9. The valve device according to claim 8 wherein
the first and second control bodies are guided for movement along the longitudinal axis of the valve piston and each has first and second control surfaces supporting the individual latching parts of each of the first and second latches in the individual latching positions;
the first and second control surfaces of each of the first and second control bodies have individual control ramps which, starting from the valve piston, are arranged on diameters of different sizes of the first and second control bodies;
the individual latching positions are axially separated from one another along the free paths; and
the third and fourth control bodies have stop surfaces distributed over different diameters, which, with respect to the longitudinal axis of the valve piston, are radially different from one another and form individual radially spaced latching positions together with the individual control ramps of the first and second control bodies.

10. The valve device according to claim 1 wherein
the first and second latches activate and release the valve piston for motion between opposite end positions.

11. The valve device according to claim 7 wherein
the rod system drive has rod system parts each provided with a widening on an end face thereof, each end face abutting against an end of a respective one of the first and second control bodies and being adjacent to the control rod, the rod system parts being arranged between the control rod and an actuating rod of the actuating magnets adjacent thereto.

\* \* \* \* \*